Sept. 15, 1942.    E. F. HIRTH    2,295,787
ROTARY RULE WITH TELESCOPING OR FOLDING HANDLE AND THE LIKE
Filed April 24, 1940
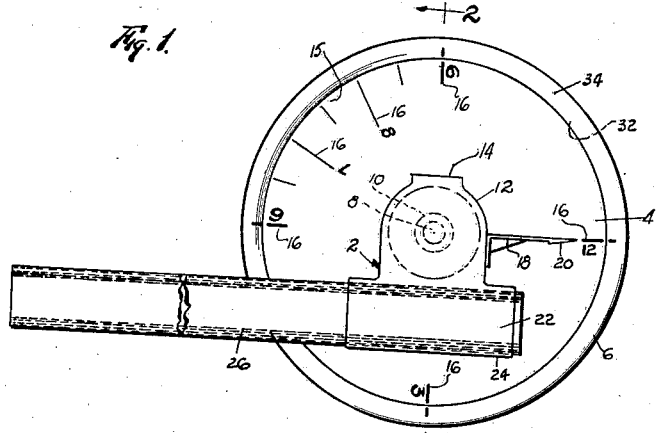
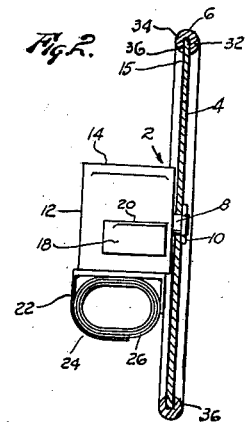
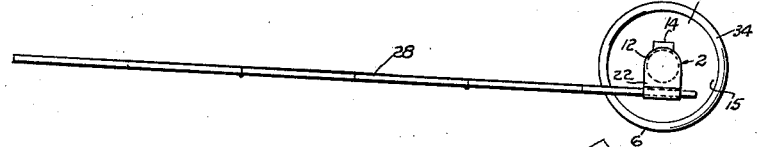
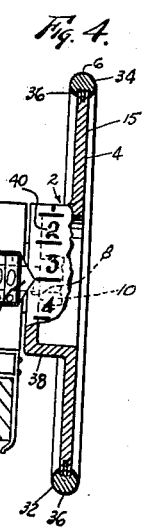
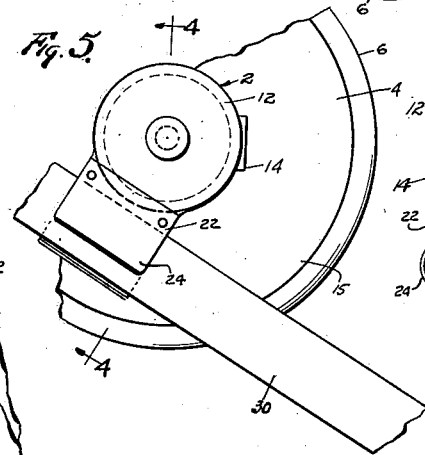
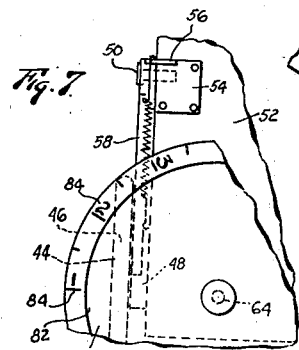
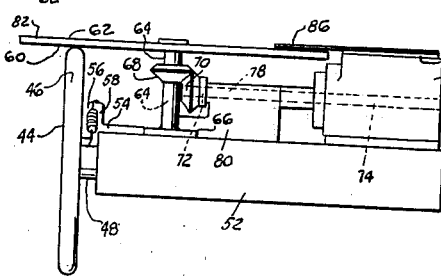
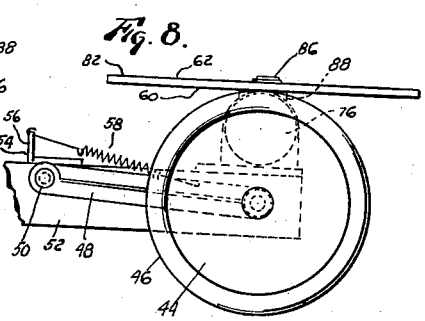
INVENTOR.
Edgar F. Hirth Patented Sept. 15, 1942

2,295,787

UNITED STATES PATENT OFFICE 2,295,787

ROTARY RULE WITH TELESCOPING OR FOLDING HANDLE AND THE LIKE

Edgar F. Hirth, Los Angeles, Calif.

Application April 24, 1940, Serial No. 331,342

1 Claim. (Cl. 33—141)

My invention relates to the rotary measuring discs and devices and more particularly to such apparatus which are used and adapted for measuring the lengths and distances by means of the rotary disc action, which when in use, said disc may be rolled over the ground or the surface which is to be measured and each revolution thereof representing a given length, may be easily recorded upon and read from the revolution counter member connected thereto, said recording and reading may be in unit length or any fraction thereof and thereby greatly facilitating the calculations of lengths and areas.

Accordingly, an object of my invention is to provide said apparatus with a suitable disc means which is mounted upon a rotatable shaft member, said shaft member being a part of the revolution counter which is a part of the apparatus, said apparatus having a suitable clamping means extending therefrom and adapted for attaching same to and upon the handle extension or a suitable telescoping rod member for facilitating its handling and in addition, said disc means having its side surface provided with a suitable indicating markings which indicate the revolutions thereof or any fractional revolution of said disc means, while the disc edge is provided with a resilient rim or tire member for preventing its damage also for preserving its serviceability and thereby maintaining the accuracy of length measurements and for preventing discrepancies in calculations while in use.

Another object of my invention is to provide said disc means of said measuring apparatus with a suitable drum means, the outside surface thereof having the indicating markings disposed thereon and having a suitable stationary pointer means extending out of said revolution counter member, so that the revolutions of said disc member or any fractional movement thereof may be easily and readily noted, read and recorded.

Further object of my invention is to provide said apparatus with a suitably arranged angular clamping means which may be adapted for attaching said apparatus upon and to a telescoping rod or a folding rule, and in addition having its angular position so arranged whereby the reading of the counter member and the indicating markings upon the disc surface or the drum surface may be readily noted, read and recorded.

Another object of my invention is to provide said apparatus with a suitable vertically mounted trailing disc means which is hingedly and adjustably mounted upon a frame and adapted to roll upon the surface the measurements of which are to be taken, said apparatus also having a horizontally positioned indicating disc means rigidly mounted upon a vertical shaft and upon said frame which is revolubly disposed within suitable bracket, having the under surface of said indicating disc means adapted for engaging the peripheral surface of said trailing disc for revolving same about its vertical shaft, also said apparatus having a pair of miter gears inter-meshed in position one connecting said vertical and the other connected to the horizontal shaft which extends outwardly and is connected to the revolution counter member adapted for reading and recording the peripheral movement or the revolution made and by said trailing disc means and thereby increasing the range in length measurements including the fraction thereof and insurments the accuracy of the calculations during the operation of the apparatus.

Other and further objects and advantages of my invention as will hereinafter more fully appear, I attain by the construction herein shown on the drawing and described in the specification forming a part of my application.

Reference is had to the accompanying drawing, in which the similar reference characters denote the similar parts.

In the drawing:

Fig. 1 is the side elevational view of the rotary measuring disc having the revolution counter associated therewith and having the telescoping handling rod attached thereto.

Fig. 2 is the vertical cross sectional view of the rotary measuring disc, taken on the line 2—2 of the Fig. 1.

Fig. 3 shows the rotary measuring disc including the revolution counter member attached to the folding rule.

Fig. 4 shows the fragmentary cross sectional view of the rotary measuring disc, showing the disc drum provided with numerical indications also having the revolution counter member, and having a clip connected thereto for attaching it to the handling rod, same shown in modified form.

Fig. 5 is the fragmentary side elevational view of the rotary measuring disc, showing the revolution counter member in position and the clip attachment disposed at an angle, taken from the left of the Fig. 4.

Fig. 6 is the end elevational view of the rotary measuring disc, in another modified form, showing the relative positions of the trailing disc and the indicating disc, including the mechanism for operating the revolution counter of the apparatus.

Fig. 7 is the fragmentary top view of the apparatus, showing the position of the trailing disc and the hinged bracket to which it is attached, taken from the top of the Fig. 6.

Fig. 8 is the side elevational view of the apparatus showing the indicating disc frictionally resting upon the peripheral edge of the trailing disc, taken from the left of the Fig. 6.

Describing my invention more in detail, said invention comprises a measuring unit generally designated by numeral 2, which is provided with a suitable disc member 4 having its diameter of any desired dimension, preferably, however, having its diameter of sufficient size, whereby its outside periphery 6 commensurate with a given unit length, such as 12 inches, or the like.

Said disc member 4, in its preferred form, is mounted upon a shaft 8 and is held thereon locked in place by means of a locking nut 10, also said shaft 8 is connected to a revolution counter member 12 so that when said disc 4 revolves it also turns said shaft member 8 which registers each turn and revolution made by said disc and upon said revolution counter member 12, said counter member 12 having a suitable visor member 14 associated therewith for recording and reading the number of rotations registered therein.

In order to register and calculate the fractional revolution of said disc 4 or the fractional portion of said unit length, the rim side section 15 of said disc 4, is provided with suitable divisional lines 16 which are for dividing said length unit into equal parts or lengths, such as inches, then, for the purpose to indicate the position of said disc 4 in relation to its fractional revolution or a turn, said counter member 12 is equipped with suitable indicator 18 which is provided with a pointer member 20 for indicating its fractional position.

Said revolution counter member 12 is also provided with a suitable clip member 22, which may, if so desired, be of any preferred design or construction, as in practice may be most desirable, having a suitable lip member 24 adapted for holding the rod member 26 in place, which may be of the telescoping type, as shown in Figs. 1 and 2, its configuration may be round or square, or it may be the folding rule or scale 28, as shown in Fig. 3, else, it may be a square extension member 30, as shown in Fig. 5.

In order to maintain the accuracy of the length unit or the revolutions, the outer edge 32 of said rim side section member 15 is provided with a suitable tire member 34, which in its preferred form is made out of resilient material such as rubber, having its outside dimensions, at the periphery 6, conforming to the required unit length, such as 12 inches in circumference, so that the wear of the surface may be greatly reduced and practically eliminated thereby providing means for utility and serviceability of the apparatus for a long period of time.

In order to facilitate the removal of said rim tire member 34 the underside section thereof is provided with an inner-peripheral groove 36 which is adapted for holding said tire member 34 in place and for mounting it straight upon the rim section of said disc 4, and also for allowing its removal or exchange for new, when same becomes damaged.

In the Fig. 4 said disc member 4 is provided at its side with a drum member 38 of which the outer surface thereof is provided with numerical indications 40, for indicating the position of said disc 4 including its fractional relation to the pointer member 42, also having the visor 14 of the revolution counter member 12 mounted in close proximity to said pointer member 42, so that the reading of the disc revolutions and any fractional portion or position thereof may be readily noted and recorded.

Also, it may be noted that the relative angular position of the visor 14 in relation to the clip member 22 is so arranged, whereby the reading of the revolutions of said counter member 12 when rolling said disc member 4 over the ground or surface, may be readily read and noted.

In the Figs. 6, 7 and 8, I have shown the length unit recording apparatus in another modified form, which comprises a trailing disc member 44 having its outside peripheral edge provided with a suitable resilient rim or tire member 46, said disc member 44 is revolubly mounted upon the end of a hinged side bracket member 48 which is pivotally mounted upon a pivot member 50 attached to the frame 52.

Said frame 52 is also provided with a spring holding bracket member 54 which is mounted rearwardly and in back from the pivot point of said pivot member 50 having a rib 56 extending therefrom and adapted for connecting thereto one end of the spring member 58 while the other end thereof is attached to the center section of the side bracket member 48 for forcing said trailing disc member 44 upwardly also for holding the tire member 46 firmly and against the under surface 60 of the indicating disc member 62 thereby providing the frictional contact between said discs 44 and 62 respectively and for revolving said indicating disc member 62 when the trailing disc 44 is rolled over the ground or surface which is to be measured.

Said indicating disc 62 is mounted upon a vertical shaft 64 which is revolubly mounted within a bearing of a bracket 66 and connected to the frame 52, as shown, said shaft 64 having a suitable mitre gear 68 mounted thereon which is held in mesh with the corresponding mitre gear 70.

Said mitre gear 70 is mounted upon the shaft end 72 which is the extension of the horizontally disposed shaft member 74 of the revolution counter member 76 also mounted upon said frame 52, having the extension shaft end section 78 supported and held in place by means of the bracket member 80, as shown.

The outside section surface 82 of said indicating disc member 62 is provided with suitable numerical indications 84 which designate the position or the revolutions of said trailer disc 44 and thereby indicating the total or the fractional turns of the indicating disc 62, which turns are indicated by the pointer member 86 and also for reading same at the visor member 88 of the revolution counter 76.

In this manner, long distances and extended surfaces may be correctly measured and recorded, also, said apparatus may with slight modifications be used for measuring the lengths of the cloth when same is rolled upon rolls in textile mills, or, in paper mills when the paper, in diversified roll sizes is rolled and cut from the calenders.

While I have thus described my invention with great particularity, it will be clear that the same may be modified throughout a wide range. I accordingly do not propose to be limited to the exact details of construction herein shown on the drawing and described in the specification, but reserve the right in practice to make the necessary changes and modifications therein, which may come within the scope of the appended claim.

I claim as my invention:

In a rotary measuring device of the class described adapted for measuring the length units or the fractional part thereof, comprising a vertically disposed measuring disc means, a shaft member in said disc means, a tire member detachably connected to the outside periphery section of said disc means for reducing its wear, a drum means extending sidewardly from said disc means disposed at its center section and in close proximity to said shaft member, measuring indications disposed at the outer surface of said drum means, a revolution counter member connected to said shaft member at a relatively close position to said drum means for registering the number of revolutions completed including any fractional turn made by said vertically disposed measuring disc means, a clip means connected to said revolution counter member, and a folding extension handle means disposed within and held by said clip means for holding and for guiding said rotary measuring disc means while rolling same over the ground surface and during the operation of the device.

EDGAR F. HIRTH.